United States Patent [19]

Dang Vu et al.

[11] Patent Number: 5,013,426
[45] Date of Patent: May 7, 1991

[54] A CATALYTIC REFORMING METHOD WITH FLOW OF A HEAT-CARRYING FLUID THROUGH A PLURALITY OF HOLLOW INTERNAL SPACES

[75] Inventors: Quang Dang Vu, Neuilly; Jean-Paul Bournonville, Cergy Pontoise; Jean-Francois Le Page, Rueil Malmaison, all of France

[73] Assignee: Institut Francais Du Petrole, Rueil Malmaison, France

[21] Appl. No.: 372,998

[22] Filed: Jun. 29, 1989

[30] Foreign Application Priority Data

Jun. 29, 1988 [FR] France ................................ 88 08898

[51] Int. Cl.⁵ ............................................ C10G 35/04
[52] U.S. Cl. .................................................... 208/134
[58] Field of Search .......................................... 208/134

[56] References Cited

U.S. PATENT DOCUMENTS 4,167,473 9/1979 Sikonia ................................ 208/139
4,544,544 10/1985 Dang Vu et al. ................... 423/659

FOREIGN PATENT DOCUMENTS 269171 11/1986 European Pat. Off. .

Primary Examiner—Curtis R. Davis
Attorney, Agent, or Firm—Millen, White & Zelano

[57] ABSTRACT

The invention provides a method for the catalytic low pressure reforming of gasolines, in the presence of hydrogen, in a reaction zone defined by a substantially cylindrical enclosure. The reaction contains a catalyst bed which has the form of a ring defined by two coaxial cylindrical walls, in which a plurality of hollow internal spaces defined by walls are entirely disposed. A heat-carrying fluid flows through the hollow internal spaces. The gasoline pass through the catalyst bed substantially perpendicularly to the longitudinal axis of the reaction zone.

20 Claims, 5 Drawing Sheets

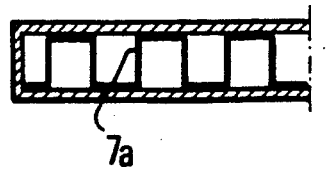
FIG.5A
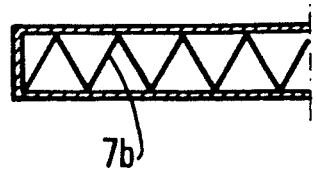
FIG.5B
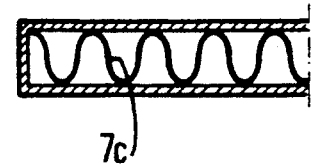
FIG.5C
FIG.5D
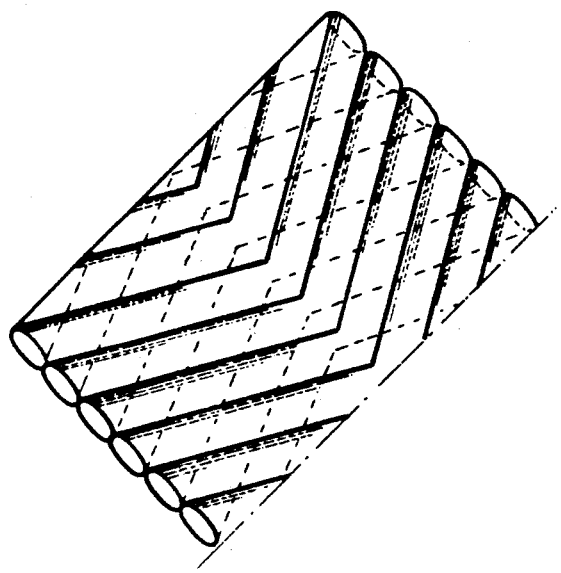

A CATALYTIC REFORMING METHOD WITH FLOW OF A HEAT-CARRYING FLUID THROUGH A PLURALITY OF HOLLOW INTERNAL SPACES

BACKGROUND OF THE INVENTION

1. Field of the Invention

The invention relates to a method of reforming gasolines under low pressure in the presence of at least one catalyst in a reaction zone, one part of which at least is heat controlled by a heat exchange device disposed therewithin the heat exchange device having hollow plates.

2. Description of the Prior Art

The quality of gasolines, and particularly their octane number, can be improved by reforming at about 500° C., in the presence of hydrogen, within several solid catalytic beds containing precious metals, such as platinum, activated by different additives such as rhenium and iridium, for example (patents U.S. Pat. No. 4,588,495, FR-B-2,593,824, FR-B-2,597,496, FR-B-2,600,668).

The reaction for reforming gasolines is generally an endothermic reaction and a drop in the reaction temperature usually takes place as the transformations progress.

The traditional method for reforming gasolines comprises three, and generally four, adiabatic reactors, disposed in series and connected together by two, and generally three, heating ovens whose role is to heat the reagents and to bring their temperature thus into the desired reaction temperature range.

The application of anti-pollution standards leads to a reduction of the lead concentration in gasolines and will in the long run lead to suppressing organo-plumbic additives in motor car fuels for controlled ignition engines. These regulations impose on refiners an increase in the severity of the operating conditions for reforming units so as to satisfy the criteria of quality required for satisfactory operation of motor car engines. Thus, refiners are led to reducing more and more the operating pressure of these reforming units. In fact, if the severity of the operating conditions is increased, in particular the octane number of the reformed products, the yield drops and the only means of offsetting this drop in yield is to operate at a lower pressure.

But, such low pressure operation is expensive and R. G. McClung et al. have shown that the limitation is due to the pressure losses through the equipment, the optimum of these losses being situated at about 0.35 to 0.5 MPa (Hydrocarbon Processing, Sept. 1983, pages 80-84).

It thus seems difficult to carry out reforming at pressures less than 0.7 MPa, and even less than 1 MPa.

SUMMARY OF THE INVENTION

Now, the present invention is characterized in particular in that the reforming of gasolines is carried out at a pressure ranging from 0.1 to 3.5 MPa, preferably from 0.1 to 2.0 MPa and, even more preferably, from 0.1 to 0.9 MPa, in the presence of at least one catalyst, in a reaction zone one part of which at least is under heat control by means of a heat transfer device comprising hollow plates (or hollow internal spaces) disposed therewithin.

A fluid is caused to flow inside this heat transfer device for the heat transfer (and withstanding the high temperature) and commonly designated heat-carrying fluid (or thermoregulation fluid).

By way of indication, one of the hydrocarbon charges to be processed may generally contain, in volume, 35 to 80% of paraffin hydrocarbons, 14 to 51% of naphthenic hydrocarbons and 2 to 18% of aromatic hydrocarbons. This charge is, for example, a naphtha distilling between about 55° C. and about 225° C.

The reaction zone may be a radial reactor (the reagents then passing through the catalytic bed in a direction which is substantially perpendicular to the axis of the reactor, for example centrifugally), having a substantially cylindrical form and are of substantially circular section.

The solid catalytic bed of said reactor, mobile or fixed, preferably mobile, may be formed by a ring which is coaxial with the substantially cylindrical casing of the reactor. Disposed in the catalytic bed are disposed the hollow internal spaces of a heat transfer device. The catalytic bed is then in the form of a ring (called "catalytic ring") defined by two coaxial cylindrical walls (a wall P for the inlet and a wall P' for the outlet of the charge) which are permeable to fluids (gas, liquids) and impermeable to the solid catalytic particles (see U.S. Pat. No. 3,909,208 for further information).

The hollow plates used in the present invention work under very little stress, which makes it possible to hollow them out completely and to let the heat-carrying fluid provide the heat exchange through the whole of the available area. In addition, the fittings and connections are sufficiently simple to be carried out readily within the restricted space offered by the reactor.

The plates are advantageously placed along the radii of the section of an ideal ring merging with or contained in the above defined catalytic ring, the catalytic volume thus heated representing generally 20 to 100%, preferably 50 to 100% of the overall catalytic (annular) volume.

In a preferred embodiment of the invention, the reaction zone is formed of two radial reactors in series (two radial reaction zones in series), having a substantially cylindrical shape and are of substantially circular section.

A heat transfer device containing hollow plates and a solid catalytic bed (fixed or mobile, preferably mobile) are disposed inside the first reactor, through which the reagents pass, for example, centrifugally from a central duct (defined by the wall P for inlet of the above mentioned charge and closed at one end to the external annular space).

The second radial reactor has a mobile catalytic solid bed for continuous renewal of the catalyst. The reagents pass, for example, centripetally therethrough (from the external annular space towards the central duct).

The second reactor is optionally equipped with a heat transfer device containing hollow plates.

Each heat transfer device is disposed in the way described above.

Similarly, the total heated catalytic volume generally represents 20 to 100%, preferably 50 to 100% of the total catalytic volume.

In the methods of the invention, the flow of the heat-carrying fluid through the heat transfer device (or heat exchange zone) heats the inside of the catalytic bed in which the device is disposed.

The thermoregulation system, i.e., the circuit of the heat-carrying fluid, does not open on to the reaction system; it is a sealed static circuit closed to the outside, flow of the heat-carrying fluid being generally caused by a pump, for example an electromagnetic pump, acting through the sealed walls of the circuit, without contact and without mechanical connection with the heat-carrying fluid (thus, the body of this pump is completely closed to the outside).

The heat-carrying fluid may be a mixture of molten salts, for example, nitrates and/or carbonates, preferably alkaline.

The heat-carrying fluid may contain at least one molten metal and/or at least one molten compound of at least one metal, which metal and compound advantageously have a melting point less than 500° C., preferably less than 400° C. and whose resistivity at 20° C. is usefully less than 90 micro-ohm.cm ($0.9 \times 10^{-6}$ ohm.m). At least one metal, chosen from the group comprising mercury, sodium, tin, lead, may, for example, be used in the heat-carrying fluid in the isolated state or in the form of a compound. There may possibly be added thereto at least one melting temperature lowering compound, such as antimony, bismuth, potassium.

A preferred composition of the heat-carrying fluid is a molten mixture of sodium and potassium containing 20 to 60% by weight of potassium and whose melting point is about 18° C.

Another advantageous composition is a lead and bismuth eutectic with a melting point equal to about 125° C.

Any reforming catalyst known to a man skilled in the art may be used.

Supported catalysts can, for example, be used containing at least one noble metal from group VIII of the periodic table of elements, generally platinum, preferably doped with at least one promoter such as iridium, germanium (U.S. Pat. No. 2,848,377), rhenium (U.S. Pat. No. 3,415,737), or tin (U.S. Pat. No. 3,700,588). Generally, a halogen such as chlorine or fluorine (FR-B-2,600,668) may be incorporated in the catalysts.

The supports for the catalysts are usually chosen from the oxides of the metals of groups II, III and/or IV of the periodic table of elements, such as, for example, magnesium, aluminium, titanium, zirconium, thorium or silicon oxides, taken alone or mixed together or with oxides of other elements of the periodic classification, such as, for example, boron, charcoal, zeolites or molecular sieves of X or Y type, or of mordenite or faujasite type, or of ZSM-5, ZSM-4, ZSM-8 L type etc, may also be used, as well as mixtures of the oxides of metals of groups II, III and/or IV with zeolitic material.

Preferably, a support is used formed mainly of alumina, i.e., in which the alumina represents at least 50% by weight with respect to the total weight of the support and preferably at least 80% by weight, and most preferably, the alumina is used alone.

BRIEF DESCRIPTION OF THE DRAWINGS

FIGS. 5A–5D illustrate heat exchange plates for use in the invention.

DESCRIPTION OF THE PREFERRED EMBODIMENTS

Different characteristics of the methods of the invention will be better understood from the following detailed description.

Figure 1:
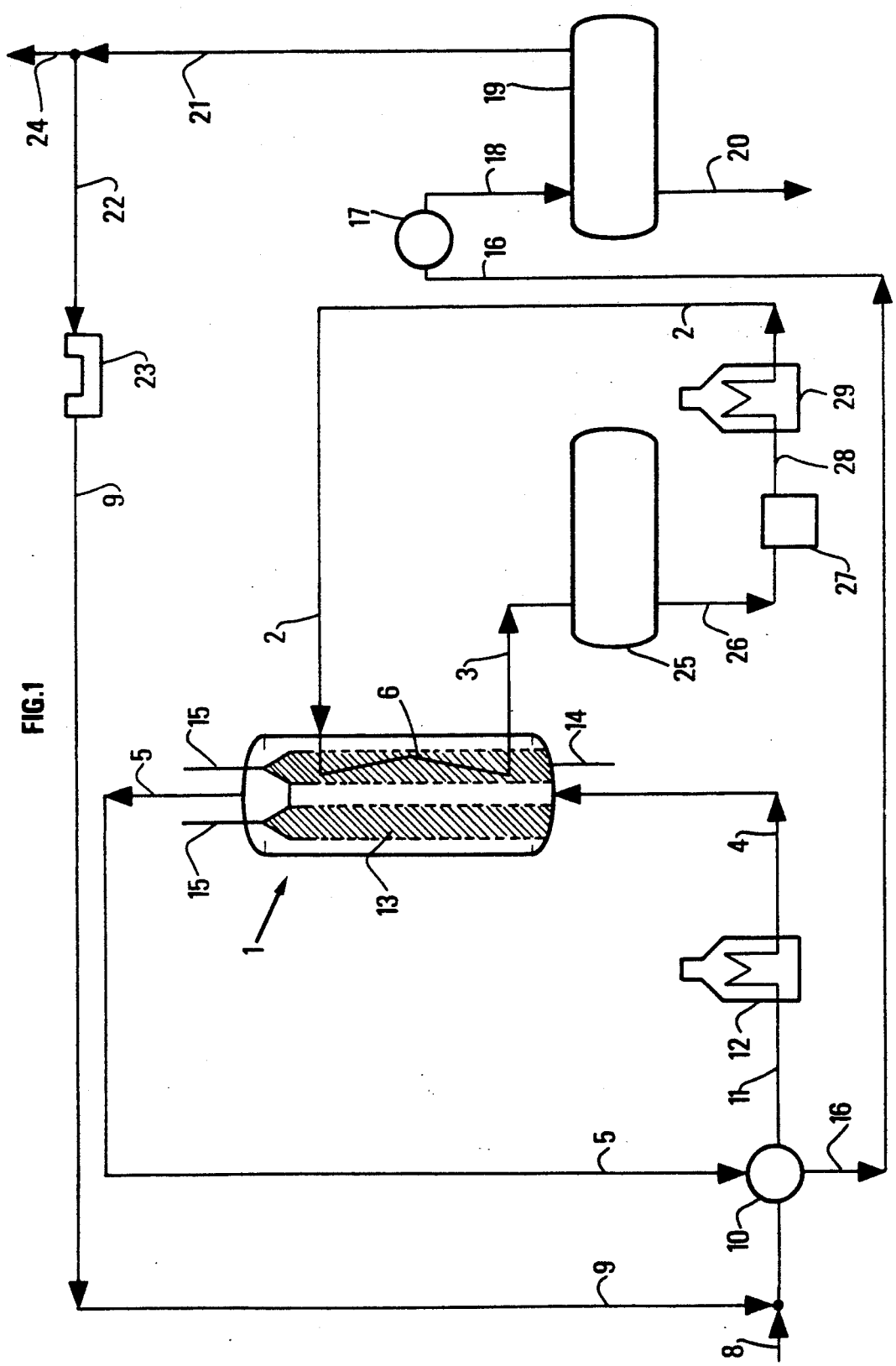
FIG. 1 illustrates an embodiment of the invention wherein one radial reactor is employed.

FIG. 1, given by way of example, illustrates one of the methods of the invention, in which the reaction zone is formed of a radial reactor 1 with mobile catalytic bed containing a hollow plate heat transfer device.

The hydrocarbon charge to be processed, preferably desulfurated, for example, desulfurated naphtha coming from the atmospheric distillation of a crude oil, is fed into duct 8 of the reforming unit where it is mixed with hydrogen brought duct 9; the molar ratio of hydrogen to the hydrocarbon charge to be processed (H2/HC) is usually ranging from 1.5 to 8, preferably from 2.5 to 5.5.

The mixture thus formed is then preferably indirectly preheated by the hot reaction effluent (coming from duct 5) through the heat exchanger 10; then it passes through duct 11 into the preheating oven 12 which brings its temperature in general to about 500° C. The reagents, conditioned by 12, are fed through duct 4 to the reaction zone 1 formed by a radial reactor whose annular mobile catalytic bed 13 contains a hollow plate heat transfer device (or heat exchange zone with hollow internal spaces).

The hydrocarbon charge is reformed within the catalytic bed 13, transforming from, for example, in the case of a naphtha, a research octane number (RON) of about 55–60 to a research octane number (RON) of about 100–105.

To avoid too great an accumulation of coke, the catalyst of bed 13 may be constantly renewed, used catalyst being drawn off continually through duct 14 situated at the bottom of bed 13 and continually replaced by fresh catalyst introduced through ducts 15 situated towards the top of bed 13.

The reaction effluent, whose temperature has practically not varied (because of the presence of the heat transfer device through which the heat-carrying fluid flows) leaves the reaction zone 1 through duct 5 to preheat the mixture (hydrocarbons+hydrogen) in exchanger 10.

Then the reaction effluent leaves 10 through duct 16 which brings it as far as a condenser 17 and then, through duct 18, is fed to a separator balloon flask 19 which provides separation of the reformate from a hydrogen rich gas mixture (recycling gas).

From 19, the reformate is fed, through duct 20, to a stabilization zone (not shown in the figures) and the gas mixture is removed through duct 21.

The major part of this gas mixture is drawn in by a recycling compressor 23 through duct 22 and is thus recycled through duct 9. The excess of gas mixture not recycled by compressor 23 is drained off through duct 24 for external uses.

At the level of the thermoregulation system, the heat-carrying fluid, for example, a molten lead and bismuth mixture, whose temperature is usually between 400° and 600° C., leaves the heat exchange device 6 through duct 3 before entering a buffer balloon flask 25 equipped with a gas scavenging device for regulating the pressure of the heat-carrying system with respect to the pressure of the reaction system. The heat-carrying fluid is then removed from said balloon flask through duct 26 and is taken up by an electromagnetic (recirculation) pump 27, whose body is completely closed to the outside, which discharges it into duct 28 for heating in an oven 29. The heat-carrying fluid, reconditioned by 29, passes into duct 2 which again brings it into the heat exchange device 6 contained in the catalytic bed 13.

Ducts 2, 3, 26 and 28 are possibly provided with a heating electric wire sleeve (for example, embedded in a heat conducting cement), as is the case when the heat-carrying fluid is a lead and bismuth mixture which is always solid at about 125° C.

Thus, one of the objects of the invention is a catalytic reforming method in which a hydrocarbon charge is caused to flow, under reforming conditions, in the presence of hydrogen, through a reaction zone defined by a substantially cylindrical enclosure. The zone contains a catalytic bed which is in the form of a ring defined by two coaxial cylindrical walls, in which a plurality of hollow internal spaces (defined by walls) is entirely disposed, through which a heat-carrying fluid flows. The charge passes through the bed substantially perpendicularly to the longitudinal axis of the reaction zone. The pressure in the zone ranges from 0.1 to 3.4 MPa, preferably from 0.1 to 2.0 MPa, and even more advantageously, from 0.1 to 0.9 MPa. The catalytic bed is fixed or mobile, preferably mobile.

Figure 2:
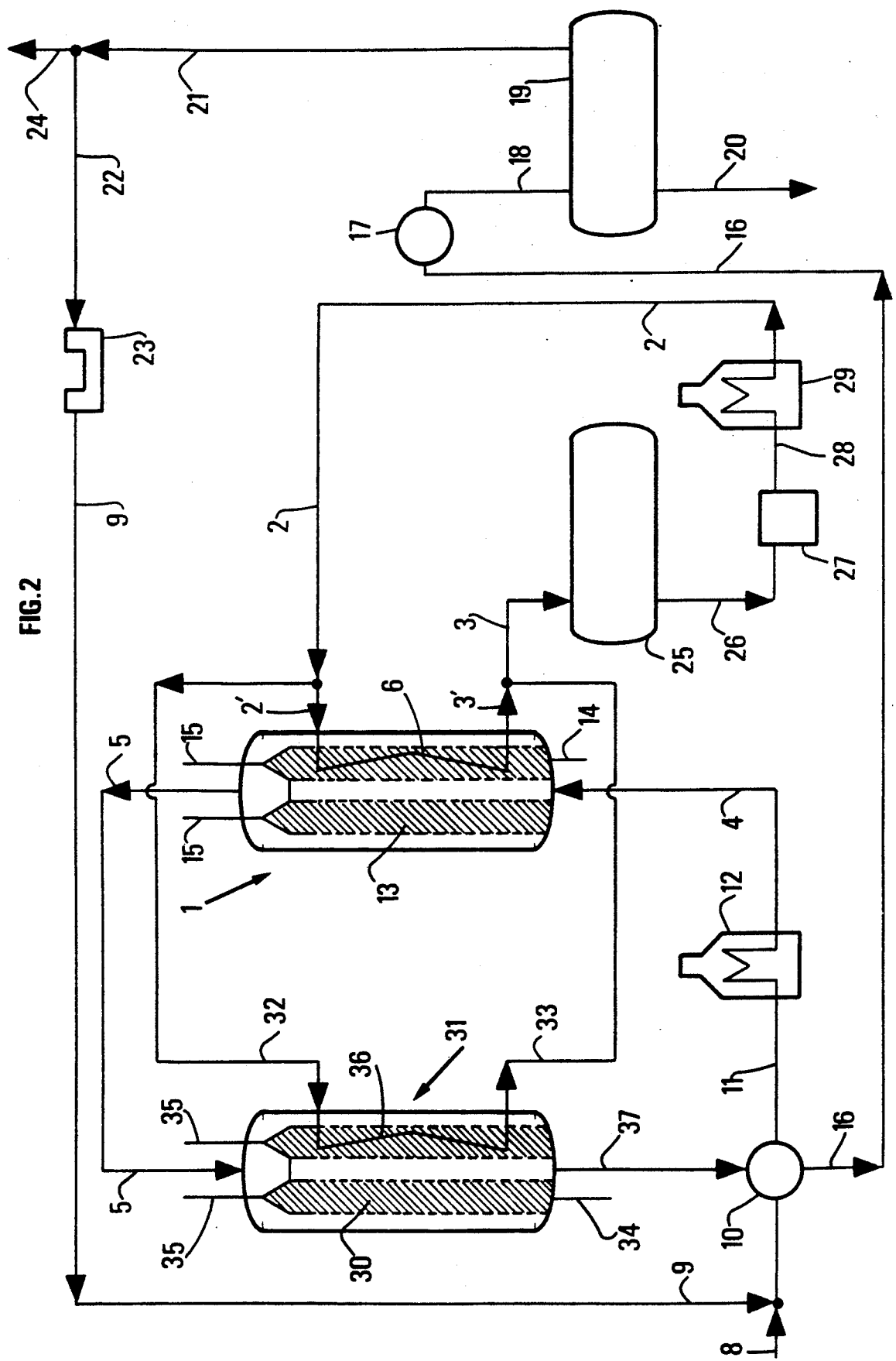
FIG. 2 illustrates an embodiment of the invention wherein two radial reactors are employed.

FIG. 2, given by way of example, illustrates another method of the invention in which the reaction zone is double, namely formed of two radial reactors 1 and 31 disposed in series:
- the first radial reactor 1 contains a hollow plate-based heat transfer device and, in a variant of the invention, a mobile catalytic bed;
- the second radial reactor 31 contains a mobile catalytic bed and, optionally, a hollow plate-based heat transfer device (identical or not to that contained in the first reactor 1).

With respect to the method illustrated above in connection with FIG. 1, between reactor 1 and the heat exchanger 10, a reactor 31 has been inserted containing a mobile catalytic bed 30 (equipped with ducts 35 and 34 for respectively introducing and drawing off the catalyst) and a heat transfer device 36 with hollow plates.

The operation of the unit of FIG. 2 remains substantially the same as that of FIG. 1. The reaction effluent leaves the reaction zone 1, through duct 5, and joins up here with the reaction zone 31 whose mobile annular catalytic bed 30 contains a hollow plate heat transfer device (or heat exchange zone with hollow internal spaces). The reaction effluent then undergoes reformation within bed 30. The final reaction effluent, whose temperature has practically not varied (because of the presence of the heat exchange device) leaves reaction zone 31 through duct 37 to preheat indirectly the mixture (hydrocarbons+hydrogen) in exchanger 10.

The thermoregulation system of the second reaction zone 31 is preferably connected to that of the first reaction zone 1. At the level of the duct 2, the heat-carrying fluid is divided into two parts, one going, through duct 2', to the heat exchange device 6 of reaction zone 1, the other flowing, through duct 32, to the heat transfer device 36 of reaction zone 31. The heat-carrying fluids leaving from 6 and 36, respectively through ducts 3' and 33, are combined in duct 3. Ducts 2, 2', 3, 3', 26, 28, 32 and 33 are optionally provided with a heating electric wire sleeve.

In the different methods of the invention, the pressure of the thermoregulation system (or heat-carrying system) is generally regulated, by means of the buffer balloon flask 25, for example, so as to be slightly lower by 0.005 to 0.5 MPa, preferably 0.01 to 0.2 MPa, than the pressure of each reaction zone.

Because of the suppression of the heating ovens and reactor stages, the pressure loss through the whole reaction system does not in general exceed 0.1 MPa, and the pressure at the input of the unit may be readily regulated to about 0.1 to 2.0 MPa.

The hourly flowrate per unit of mass of hydrocarbon charge to be processed is usually equal to 1 to 10 times, preferably 2 to 5 times, the total mass of catalyst present in the whole reaction system.

The invention also relates to a catalytic reforming method in which a hydrocarbon charge is caused to circulate, under reforming conditions in the presence of hydrogen, successively through two reaction zones each defined by a substantially cylindrical enclosure, the first reaction zone through which the charge passes containing a catalytic bed which is in the form of a ring defined by two coaxial cylindrical walls, in which a plurality of hollow internal spaces (defined by walls) is entirely disposed, through which a heat-carrying fluid flows. The charge passes through the bed substantially perpendicularly to the longitudinal axis of the first reaction zone. The second reaction zone contains a mobile catalytic bed (identical or not to that of the bed of the first reaction zone) which is in the form of a ring defined by two coaxial cylindrical walls. The reagents passes through the bed substantially perpendicularly to the longitudinal axis of the second reaction zone. In both reaction zones, the pressure is ranges from 0.1 to 3.5 MPa, preferably from 0.1 to 2.0 MPa, and even more preferably, from 0.1 to 0.9 MPa.

The catalytic bed contained in the first reaction zone is fixed or mobile, preferably mobile.

A plurality of hollow internal spaces through which a heat-carrying fluid flows may, for example, be entirely disposed in the catalytic bed of the second reaction zone.

The invention also relates to the implementation of the methods through the employment of hollow internal spaces of special conceptions for the flow of the heat-carrying fluid.

In the following description, for the sake of simplicity, reference will only be made to the reactor or reaction zone 1, but the description will also apply to the reactor (reaction zone) 31 in the case where it is provided with a heat exchange device or zone with hollow plates (or hollow internal spaces).

Figure 3:
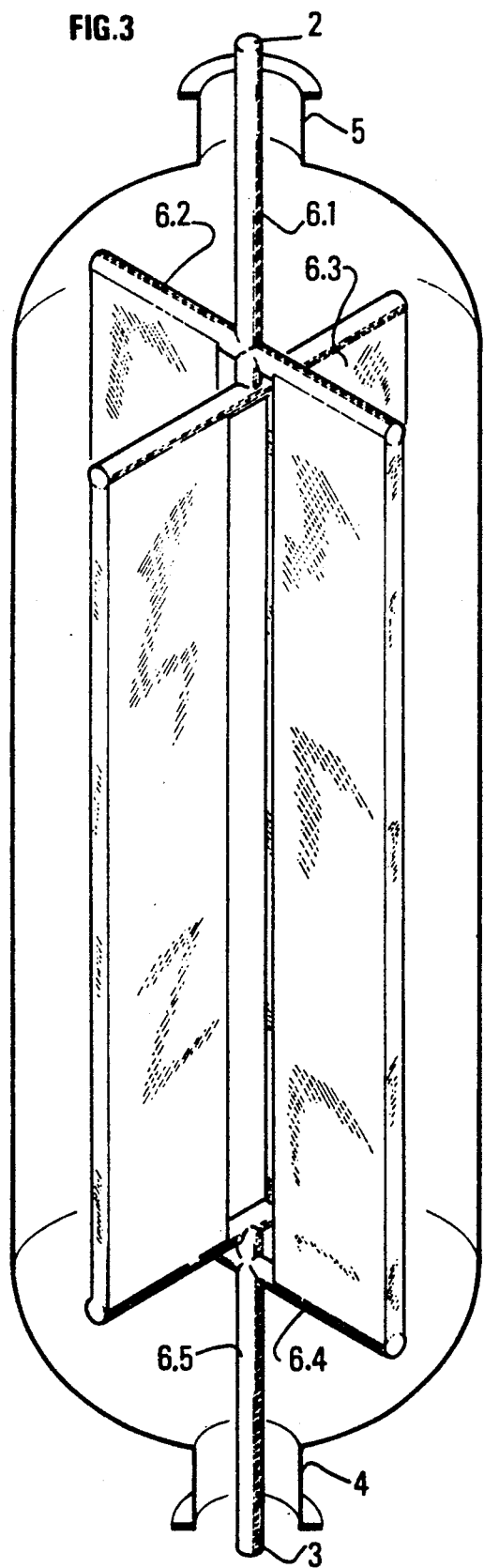
FIGS. 3, 3A, 3B, 4A and 4B illustrate views of radial reactors for use in the invention.
Figure 4:
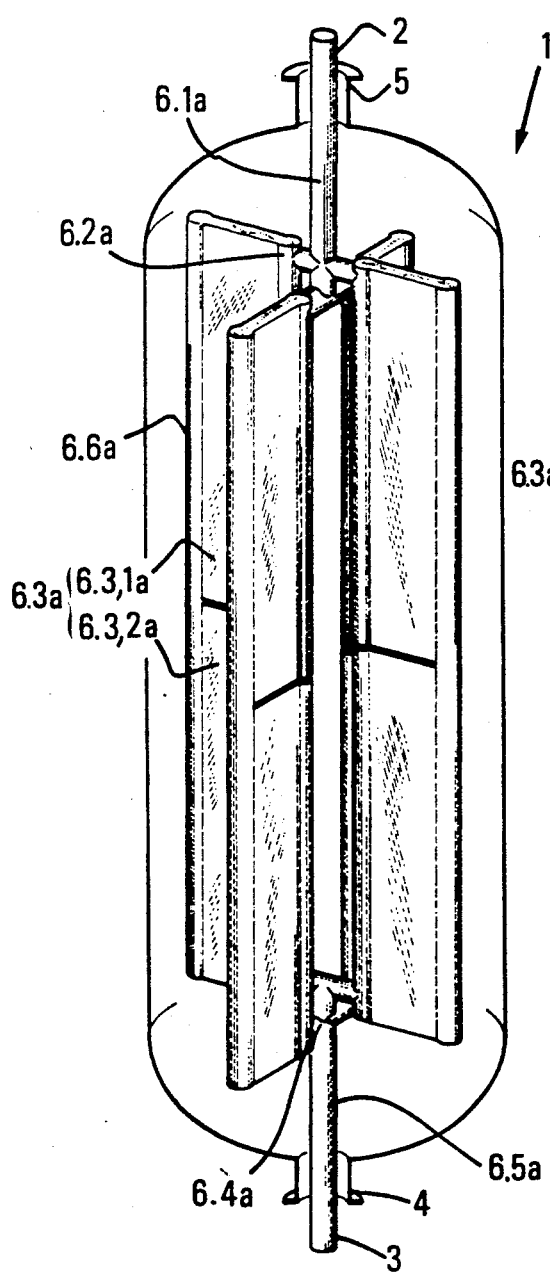

FIGS. 3 and 4 each show a design in which the hollow internal spaces (or hollow plates) have been shown with flat faces (which correspond to a preferred embodiments of the invention). The catalytic ring is not been shown in FIGS. 3 and 4 so as not to overload the figures.

FIGS. 3A, 3B and 4A, 4B show better the situation of the catalytic ring 13 or 30 (the wall P" is impermeable to fluids and solid catalytic particles).

FIGS. 5A, 5B, 5C and 5D show plates according to an improvement of the invention.

In the two types of flow path of the heat-carrying fluid (FIGS. 3, 3A, 3B and 4, 4A, 4B), a reaction zone or enclosure 1 is used, of a substantially cylindrical shape and whose section has a substantially circular shape, comprising at least one duct 2 for introducing a heat-carrying fluid, at least one duct 3 for drawing off the heat-carrying fluid, at least one duct 4 for introducing a charge into the enclosure and at least one duct 5 for drawing off the reaction effluent from the enclosure.

The heat exchange device used in the first type of heat-carrying fluid flow contains (see FIGS. 3, 3A, 3B):

a) at least one central distributing collector 6.1, for example, vertical, whose axis corresponds generally to the axis of the enclosure, which is situated in the upper part of the enclosure and is connected to duct 2, b) a plurality of distributing collectors 6.2, perpendicular to the axis of the enclosure, these collectors being connected individually to the central distributing collector 6.1, c) at least one central receiving collector 6.5, for example, vertical, whose axis corresponds generally to the axis of the enclosure, which is situated in the lower part of the enclosure and is connected to duct 3, d) a plurality of receiving collectors 6.4, perpendicular to the axis of the enclosure, these collectors being connected individually to the central receiving collector 6.5, e) a plurality of hollow continuous and elongate plates intended for the flow of the heat-carrying fluid, each plate comprising an opening on a distributing collector 6.2 and an opening on a receiving collector 6.4.

The distributing collector 6.1 may, if required, end in a circular ring to which the different distributing collectors 6.2 are connected. Similarly, the different receiving collectors 6.4 may be connected to a circular ring terminating the central receiving collector 6.5.

The faces of the hollow plates may be formed by corrugated metal sheets whose corrugations may be chosen from one of the following forms: square, rectangular, triangular, sinusoidal and a herring bone pattern (see FIG. 5D), the aim being to create a high turbulence in the flow of the heat-carrying fluid.

The hollow plates should be substantially parallelepipedic (6.3), each plate comprising two wide parallel faces defining a plane disposed radially with respect to the axis of the enclosure and four thin faces, two of them being parallel to the axis of the enclosure, the other two being perpendicular to this axis. Each plate is connected, by its thin upper face perpendicular to the axis of the enclosure, to a distributing collector 6.2 and, by its thin lower face perpendicular to the axis of the enclosure, to a receiving collector 6.4. These four thin faces may, possibly, be not flat, but, for example, semi-cylindrical.

The hollow plates or hollow internal spaces are contained entirely in the catalytic ring (see above).

Figure 3A:
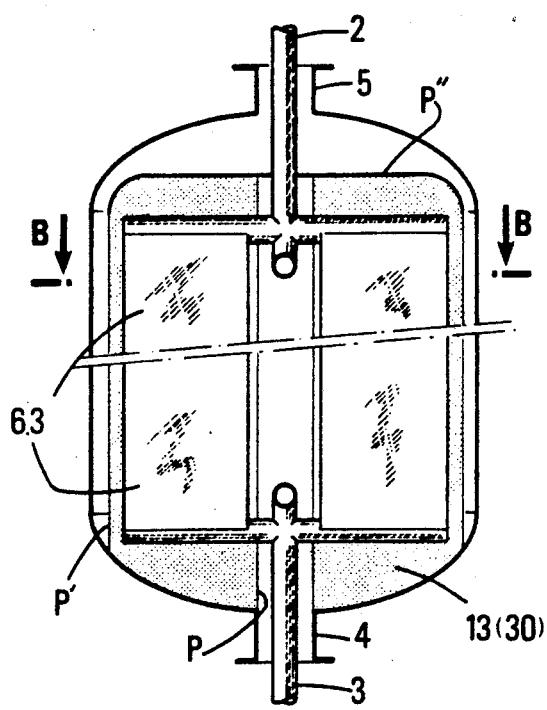
Figure 3B:
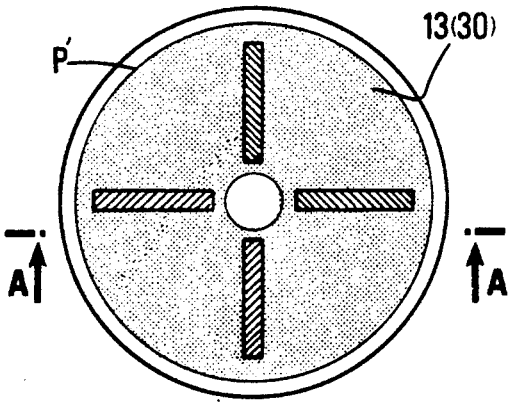

With reference to FIGS. 3, 3A, and 3B, given by way of examples, the path of the reagents through the reaction zone 1 will be described and also the path of the heat-carrying fluid through the substantially parallelepipedic hollow plates (or hollow internal spaces). After penetrating into the reaction zone 1 through duct 4, the reagents pass through the catalytic ring substantially perpendicularly to the axis of the reaction zone (in FIGS. 3, 3A, 3B and 4, 4A, 4B this passage is centrifugal, i.e. taking place from the central part of said ring, portion free of catalyst, towards the annular space (without catalyst) external to the ring, but it may also be centripetal). Effluent leaves the zone through duct 5.

In this improved invention:

the heat-carrying fluid is fed into a central distributing zone 6.1, the fluid from the central distributing zone 6.1 is divided into distributing zones 6.2, the fluid is fed from the distributing zones 6.2 into the hollow internal spaces 6.3, defined by walls (the spaces having a substantially parallelepipedic shape; each space 6.3 comprises two wide parallel faces defining a plane disposed radially with respect to the axis of the reaction zone 1 and four thin faces, two of which are parallel to the axis of the reaction zone 1, the other two being perpendicular to this axis), through their thin upper face perpendicular to the axis of the reaction zone 1, the fluid is caused to flow inside the hollow internal spaces 6.3 in the form of a sheet, the heat-carrying fluid is discharged from the hollow internal spaces 6.3, through their lower thin face perpendicular to the axis of the reaction zone 1, into collecting zones 6.4. The latter are connected to a central collecting zone 6.5 from which the fluid is then drawn off.

The heat exchange device used in the second type of flow of the heat-carrying fluid comprises (see FIGS. 4, 4A, 4B):

a) at least one central distributing collector 6.1a, for example, vertical, whose axis generally corresponds to the axis of the enclosure, which is situated in the upper part of the enclosure and which is connected to duct 2, b) a plurality of distributing collectors 6.2a, parallel to the axis of the enclosure, these collectors being connected individually, towards their top, to the central distributing collector 6.1a, c) at least one central receiving collector 6.5a, for example, vertical, whose axis corresponds generally to the axis of the enclosure, which is situated in the lower part of the enclosure and which is connected to duct 3, d) a plurality of receiving collectors 6.4a, parallel to the axis of the enclosure, these collectors being, on the one hand, connected individually, towards their base to the central receiving collector 6.5a and, on the other hand, each situated in the extension of a corresponding distributing collector 6.2a, the contact surface between a receiving collector 6.4a and its corresponding distributing collector 6.2a being sealed, e) a plurality of connecting collectors 6.6a, each of them being, on the one hand, parallel to the axis of the enclosure, to a distributing collector 6.2a and to a corresponding receiving collector 6.4a, and, on the other hand, situated in the same plane defined by this distributing collector 6.2a, this receiving collector 6.4a and the axis of the enclosure, f) a plurality of hollow continuous and elongate plates (hollow internal spaces) 6.3a intended for the flow of the thermoregulation fluid, each plate being divided, in the width direction, into two hollow semi-panels or hollow internal semi-spaces 6.3, 1a and 6.3, 2a, the contact surface between these two semi-panels being sealed, these two semi-panels being open on to a connecting collector 6.6a which causes the two semi-panels 6.3, 1a and 6.3, 2a to communicate with each other, the upper semi-panel or upper semi-space 6.3, 1a being open on to a distributing collector 6.2a, the lower semi-panel or lower semi-space 6.3, 2a being open on to the corresponding receiving collector 6.4a.

The central distributing collector 6.1a may possibly terminate in a circular ring to which the different distributing collectors 6.2a are connected. The different receiving collectors 6.4a may also be connected to a circular ring terminating the central receiving collector 6.5a.

In a variant of the invention, the faces of the hollow plates may be formed by corrugated metal sheets whose corrugations are chosen from one of the following forms: square, rectangular, triangular, sinusoidal and a herring bone pattern (see FIG. 5D), the aim being to create a high turbulence in the flow of the heat-carrying fluid.

The hollow plates are substantially parallelepipedic (6.3a), each plate comprising two wide parallel faces defining a plane disposed radially with respect to the axis of the enclosure 1 and four thin faces, two of them being parallel to the axis of the enclosure, the other two being perpendicular to this axis. Each plate is divided, in the width direction, into two hollow semi-panels or hollow internal semi-spaces 6.3, 1a and 6.3, 2a, the contact surface between these two semi-panels being sealed. These two semi-panels are open, over the whole of their thin face parallel to the axis of the enclosure and the furthest away from this axis, on to a connecting collector 6.6a which causes the two semi-panels 6.3, 1a and 6.3, 2a to communicate with each other. The upper semi-panel or upper semi-space 6.3, 1a opens, over the whole of its thin face parallel to the axis of the enclosure and the closest to this axis, on to a distributing collector 6.2a. The lower semi-panel or lower semi-space 6.3, 2a is open, over the whole of its thin face parallel to the axis of the enclosure and the closest to this axis, on the corresponding receiving collector 6.4a. The thin faces of each hollow plate may possibly be not flat but, for example, semi-cylindrical.

These hollow internal spaces or plates are disposed, completely in the catalytic ring.

Figure 4A:
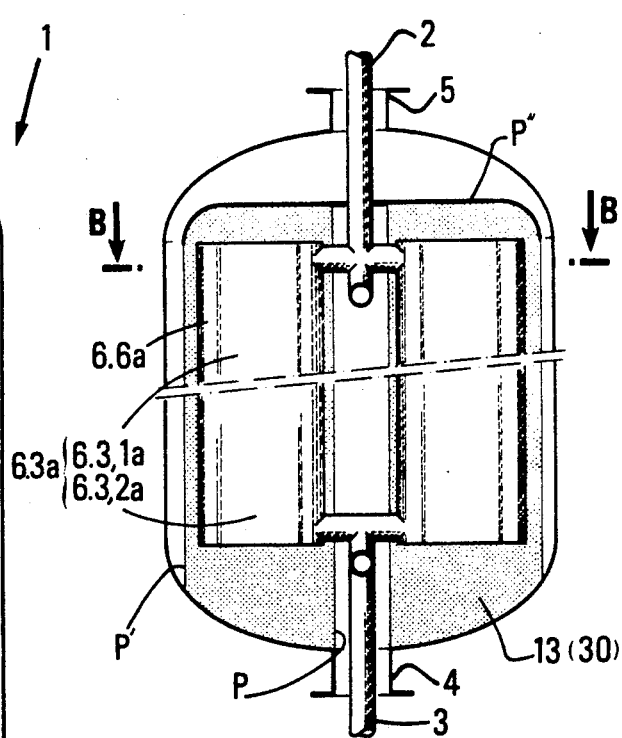
Figure 4B:
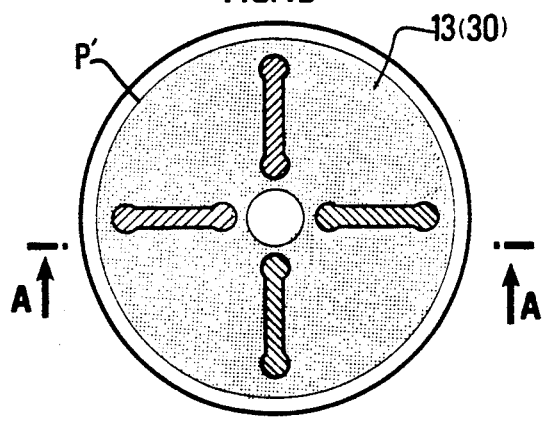

In FIGS. 4, 4A, 4B, given by way of examples, the path of the reagents through the reaction zone 1 will be described and as well as the path of the heat-carrying fluid through the hollow plates (hollow internal spaces) which are substantially parallelepipedic.

The reagents follow the same path as shown for FIGS. 3, 3A, 3B. In so far as the heat-carrying fluid is concerned:

the fluid is fed into a central distributing zone 6.1a,
the fluid from the central distributing zone 6.1a is divided up into distributing zones 6.2a,
the fluid is caused to penetrate, from said distributing zones 6.2a, into the upper hollow internal semi-spaces 6.3, 1a, defined by walls: each upper semi-space 6.3, 1a having a substantially parallelepipedic shape (each upper semi-space thus comprising two wide parallel faces defining a plane disposed radially with respect to the axis of the reaction zone 1 and four thin faces, two of which are parallel to the axis of the reaction zone 1 and the other two being perpendicular to this axis); the fluid penetrates into the upper semi-spaces 6.3, 1a through their thin face parallel to the axis of the reaction zone defined by a substantially cylindrical shaped enclosure 1 with substantially circular section, this face being the closest to this axis,
the fluid is caused to flow inside the upper hollow internal semi-spaces 6.3,1a in the form of a sheet,
the fluid is discharged from the upper semi-spaces 6.3,1a, through their thin face parallel to the axis of the reaction zone 1 and the furthest away from this axis, into connecting zones 6.6a which each connect an upper semi-space 6.3,1a with a lower hollow internal semi-space 6.3,2a situated in the extension of said upper semi-space 6.3,1a; each lower semi-space 6.3,2a is defined by walls and has a substantially parallelepipedic shape which is defined as for an upper semi-space 6.3,1a,
the fluid is caused to penetrate, from the connecting zones 6.6a, into the lower semi-space 6.3,2a through their thin face parallel to the axis of the reaction zone 1 and the furthest from this axis,
the fluid is caused to flow inside the lower hollow internal semi-spaces 6.3,2a in the form of a sheet,
the heat-carrying fluid is discharged from the lower semi-spaces 6.3,2a, through their thin face parallel to the axis of the reaction zone 1 and the closest to this axis, into collecting zones 6.4a which are connected to a central collecting zone 6.5a from which the fluid is then drawn off.

In a variant of the invention, the hollow plates may, if required, have different widths. This makes it possible to maintain a minimum ratio between the volume of the enclosure and the exchange area, while avoiding too great a distance between any point of the enclosure and the nearest plate.

It should be noted that adjacent channels may be formed in substantially parallelepipedic hollow plates (see FIGS. 5A, 5B and 5C) by means of corrugated metal sheets. The sections of the channels are chosen from one of the following forms: square, rectangular (5A), triangular (5B) and sinusoidal (5C). These channels connect together the two thin faces parallel to the axis of the enclosure of the same plate. On the one hand, the presence of these adjacent channels ensures the strength of the hollow plates which may reach and exceed, for example, 10 meters in height. On the other hand, it avoids the formation of dead zones (i.e., zones through which the heat-carrying fluid does not flow) which might be formed because of the sheet flow of the heat-carrying fluid inside the plates.

The metal sheets may be assembled together either by welding, or much more economically by brazing, either by points or by immersion into a bath, or any other adequate technique.

The metal sheets possibly used in the different embodiments of the invention generally have a thickness less than 10 mm, preferably less than 3 mm.

In the figures, enclosure 1 is shown in a substantially vertical position. The flows of the thermoregulation fluid and of the charge may take place from top to bottom, as described above, but also from bottom to top (and so also contraflow wise).

Similarly, the enclosure may be used in a substantially slanted position, or in a substantially horizontal position.

This is the case when, with a very long enclosure, there is a substantial difference in static pressure between the top and bottom of the enclosure.

The invention is illustrated by the following examples:

EXAMPLES

EXAMPLE 1 (comparative)

In an industrial catalytic reforming unit, operating like a conventional model with four adiabatic reactors with mobile beds, is loaded a charge containing a mixture of crude oil naphtha and thermal cracking-coking naphtha.

The hydrocarbon charge thus formed has the following composition (by volume):

|  |  |
|---|---|
| paraffins: | 55.3% |
| naphtenes: | 38.7% |
| aromatics: | 6.0% |

This charge is mixed with a recycling gas comprising 84% hydrogen so as to form a reaction mixture having a molar ratio hydrogen to the naphtha is equal to about 4.

The reagent thus obtained is delivered to a reaction system containing a catalyst supported by alumina (specific area 220 m$^2$/g and of porous volume 0.57 cm$^3$/g) and comprising platinum, chlorine and rhenium (by weigth: 0.35% Pt; 0.25% Re; 1.12% Cl).

The hourly flowrate per unit of mass of the naphtha charge is equal to about 3.2 times the mass of catalyst present in the reaction system, in the whole of the four reactors.

The pressure at the inlet to the first reactor is kept at 1.2 MPa and the pressure at the outlet of the last reactor is equal to 0.93 MPa, namely a drop of 0.27 MPa through the reaction system.

The temperatures at the input of the four reactors are adjusted to 502° C. by controlling the preheating and heating ovens.

On leaving each reactor, the following temperatures are noted:

|  |  |
|---|---|
| 1st reactor: | 417° C. |
| 2nd reactor: | 436° C. |
| 3rd reactor: | 468° C. |
| 4th reactor: | 492° C. |

At the end of the unit, a 98 RON (research octane number) reformate is obtained with the following yields (weight % with respect to the charge):

|  |  |
|---|---|
| H$_2$: | 2.8% |
| C$_{1-2}$: | 3.5% |
| C$_{3-4}$: | 7.9% |
| Reformate (C$_5$+): | 85.8% |

EXAMPLE 2

In a semi-industrial catalytic reforming unit whose diagram corresponds to that of FIG. 1, a mobile bed reactor is disposed equipped with a heating plate system formed in accordance with FIGS. 4 and 5C and filled with the same catalyst as that used in the preceding industrial unit.

The heating plates have flowing therethrough a lead and bismuth-based heat carrier.

The heat carrier enters the plates at 515° C. and leaves at 505° C.

The same charge (naphtha) as before is loaded and the unit is adjusted so as to obtain an output pressure of 0.53 MPa and an input and output reactor temperature of 502° C.

The gas is recycled in the molar ratio H$_2$/charge of 4 and the hourly flowrate per unit of mass of the charge is readjusted so as to obtain a 98 RON reformate.

At this time, it can be noted that:

the ratio between the hourly flowrate per unit of mass of the charge and the mass of the catalyst contained in the reactor is equal to 3.5 instead of 3.2 as in adiabatic operation (Example 1);

the pressure at the input of the reactor is equal to 0.5 MPa against 0.93 to 1.2 MPa at the input of the adiabatic reactors (Example 1);

the temperature of the reagents, although equal to 502° C. at the input and at the output, exhibits however a minimum at 450° C. within the reactor;

the yields obtained are the following (weight % with respect to the charge);

|  |  |
|---|---|
| H$_2$: | 3.1% |
| C$_{1-2}$: | 2.6% |
| C$_{3-4}$: | 5.8% |
| Reformate (C$_5$+): | 88.5% |

Because of the low pressure operation permitted by this isotherm reaction system, 2.7 points are gained on the reformate yield.

If the mobile bed is replaced by a fixed bed (the other equipment and operating conditions remaining the same), the following yields (weight % with respect to the charge) are obtained:

|  |  |
|---|---|
| H$_2$: | 3.1% |
| C$_{1-2}$: | 2.7% |
| C$_{3-4}$: | 5.9% |
| Reformate (C$_5$+): | 88.3% |

EXAMPLE 3

With two mobile bed reactors available, the catalyst (identical to that of Example 1) is distributed in a ratio of 50/50.

The first reactor is equipped with a heating plate system formed as shown in FIGS. 4 and 5C, the second reactor is adiabatic (without heat exchange device).

The heat-carrying fluid is the same as that used previously.

With the same operating conditions as those of Example 2, it can be seen that:

the hourly flowrate per unit of mass of the charge is equal to 3.7 times the mass of catalyst contained in the whole of the reaction system (i.e., the two reactors);

the input pressure has risen to 0.59 MPa instead of 0.56 MPa in the preceding operation (Example 2);

in the first reactor, the input and output temperatures are the same and equal to 502° C., but the minimum within the catalytic bed has risen from 450° C. (Example 2) to 480° C.;

in the second reactor, the products entering at 502° C. leave at 492° C.;

the yields (weigth % with respect to the charge) have not varied substantially with respect to those of Example 2 (the reformate yield has very slightly increased):

|  |  |
|---|---|
| H$_2$: | 3.2% |
| C$_{1-2}$: | 2.5% |
| C$_{3-4}$: | 5.6% |
| Reformate (C$_5$+): | 88.7% |

EXAMPLE 4

Two isotherm reactors are provided, i.e., each equipped with a system of heating plates formed as shown in FIGS. 4 and 5C, these reactors having a mobile bed (with a catalyst identical to that of preceding examples and distributed in a ratio of 50/50).

After adjustment to the same operating conditions as in Example 3, the appreciable differences (with respect to Example 3) are situated at the level of the output temperature of the second reactor which has risen to 502° C. and of the hourly flowrate per unit of mass processed which has passed from 3.7 to 3.8 times the mass of catalyst contained in the whole of the reaction system. Finally, the yields (weight % with respect to the charge) are the following:

| | |
|---|---|
| $H_2$: | 3.3% |
| $C_{1-2}$: | 2.4% |
| $C_{3-4}$: | 5.4% |
| Reformate ($C_5+$): | 88.9% |

What is claimed is:

1. A method of catalytically reforming hydrocarbons, comprising:

flowing a hydrocarbon charge through a reaction zone under reforming conditions and in the presence of hydrogen, said reaction zone being defined by a substantially cylindrical shaped enclosure having a longitudinal axis, wherein the pressure is 0.1 to 3.5 MPa, said reaction zone containing a catalyst bed in the form of a ring defined by two coaxial cylindrical walls, entirely disposed within said catalyst bed are a plurality of hollow internal spaces defined by walls, said internal spaces have a substantially parallelepipedic shape and are disposed radially with respect to said longitudinal axis of said reaction zone, providing a flow of heat-carrying fluid through said internal spaces, and said charge passes through said catalyst bed in a direction which is substantially perpendicular to said longitudinal axis of said reaction zone.

2. A method according to claim 1, wherein said catalytic bed is mobile.

3. A method of catalytically reforming hydrocarbons, comprising:

flowing a hydrocarbon charge successively through a first reaction zone and a second reaction zone under reforming conditions and in the presence of hydrogen, each of said reaction zones is defined by a substantially cylindrical shaped enclosure having a longitudinal axis, wherein the pressure is 0.1 to 3.5 MPa, said first reaction zone containing a catalyst bed in the form of a ring defined by two coaxial cylindrical walls, entirely disposed within said catalyst bed of said first reaction zone is a plurality of hollow internal spaces defined by walls, said internal spaces have a substantially parallelepipedic shape and are disposed radially with respect to said longitudinal axis of said first reaction zone, providing a flow of heat-carrying fluid through said internal spaces, passing said charge through said catalyst bed in a direction which is substantially perpendicular to the longitudinal axis of said first reaction zone, said second reaction zone containing a mobile catalyst bed which is in the form of a ring defined by two coaxial cylindrical walls, and passing reaction effluent from said first reaction zone through said catalyst bed of said second reaction zone in a direction which is substantially perpendicular to said longitudinal axis of said second reaction zone.

4. A method according to claim 3, wherein said catalyst bed of said second reaction zone contains a plurality of hollow internal spaces defined by walls and of a substantially parallelepipedic shape, through which a heat-carrying fluid flows.

5. A method according to claim 3, wherein said catalyst bed of said first reaction zone is mobile.

6. A method according to claim 1, wherein the pressure in said reaction zone is 0.1 to 0.9 MPa.

7. A method according to claim 1, wherein inside said reaction zone containing hollow internal spaces:

a heat-carrying fluid is fed into a central distributing zone, said heat-carrying fluid is discharged from said central distributing zone and divided among a plurality of distributing zones, said heat-carrying fluid is fed from said plurality of distributing zones into said hollow internal spaces, each hollow internal space having substantially parallelepipedic shaped, said heat-carrying fluid penetrating into each of said hollow internal spaces through a thin upper face thereof, said upper face being perpendicular to said axis of said reaction zone, said heat-carrying fluid flows inside said hollow internal spaces in the form of a sheet, and said heat-carrying fluid is discharged from each of said hollow internal spaces through a thin lower face thereof, said lower face being perpendicular to said axis of said reaction zone, into a plurality of collecting zones which are connected to a central collecting zone from which said heat-carrying fluid is then drawn off.

8. A method according to claim 1, wherein inside said reaction zone containing hollow internal spaces, each of said hollow internal spaces is divided in its width direction into an upper hollow internal semi-space and a lower hollow internal semi-space, said heat-carrying fluid is fed into a central distributing zone, said heat-carrying fluid is discharged from said central distributing zone and divided among a plurality of distributing zones, said heat-carrying fluid is discharged from said plurality of distributing zones and delivered into said upper hollow internal semi-spaces, each upper hollow internal semi-space having a substantially parallelepipedic shape, said heat-carrying fluid penetrating into each of said upper hollow internal semi-spaces through a thin face thereof, said thin face being parallel to said axis of said reaction zone and being the closest of said axis, said heat-carrying fluid flows inside said upper hollow internal semi-spaces in the form of a sheet, said heat-carrying fluid is discharged from each of said upper hollow internal semi-spaces, through a thin face thereof, said thin face being parallel to said axis of said reaction zone and being the furthest away from said axis, into a plurality of connecting zones, each of which connect an upper hollow internal semi-space with a lower hollow internal semi-space situated in an extension of said upper hollow internal semi-space, each lower hollow internal semi-space having a substantially parallelepipedic shape, said heat-carrying fluid is discharged from said plurality of connecting zones and delivered into each of said lower hollow internal semi-spaces through a thin face thereof, said thin face being parallel to said axis of said reaction zone and being the furthest away from said axis, said heat-carrying fluid flows inside said lower hollow internal semi-spaces in the form of a sheet, and said heat-carrying fluid is discharged from each of said lower hollow internal semi-spaces, through a thin face thereof, said thin face being parallel to said axis of said reaction zone and being the closest to said axis, into a second plurality of collecting zones which are connected to a central collecting zone from which said heat-carrying fluid is then drawn off.

9. A method according to claim 5, wherein the catalyst bed of said first zone is mobile.

10. A method according to claim 3, wherein the pressure in said reaction zones is 0.1 to 0.9 MPa.

11. A method according to claim 5, wherein the pressure in said reaction zones is 0.1 to 0.9 MPa.

12. A method according to claim 3, wherein inside said reaction zone containing hollow internal spaces:
a heat-carrying fluid is fed into a central distributing zone,
said heat-carrying fluid is discharged from said central distributing zone and divided among a plurality of distributing zones,
said heat-carrying fluid is fed from said plurality of distributing zones into said hollow internal spaces, each hollow internal space having a substantially parallelepipedic shape, said heat-carrying fluid penetrating into each of said hollow internal spaces through a thin upper face thereof, said upper face being perpendicular to said axis of said reaction zone,
said heat-carrying fluid flows inside said hollow internal spaces in the form of a sheet, and
said heat-carrying fluid is discharged from each of said hollow internal spaces through a thin lower face thereof, said lower face being perpendicular to axis of said reaction zone, into a plurality of collecting zones which are connected to a central collecting zone from which said heat-carrying fluid is then drawn off.

13. A method according to claim 5, wherein inside said reaction zone containing hollow internal spaces:
a heat-carrying fluid is fed into a central distributing zone,
said heat-carrying fluid is discharged from central distributing zone and divided among a plurality of distributing zones,
said heat-carrying fluid is fed from said plurality of distributing zones into said hollow internal spaces, each hollow internal space having a substantially parallelepipedic shape, said heat-carrying fluid penetrating into each of said hollow internal spaces through a thin upper face thereof, said upper face being perpendicular to said axis of said reaction zone,
said heat-carrying fluid flows inside said hollow internal spaces in the form of a sheet, and
said heat-carrying fluid is discharged from said hollow internal spaces through a thin lower face thereof, said lower face being perpendicular to said axis of said reaction zone, into a plurality of collecting zones which are connected to a central collecting zone form which said heat-carrying fluid is then drawn off.

14. A method according to claim 13, wherein the pressure in said reaction zones is 0.1 to 0.9 MPa.

15. A method according to claim 3, wherein inside said reaction zone containing hollow internal spaces, each of said hollow internal spaces is divided in its width direction into an upper hollow internal semi-space and a lower hollow internal semi-space,
said heat-carrying fluid is fed into a central distributing zone,
said heat-carrying fluid is discharged from said central distributing zone and divided among a plurality of distributing zones,
said heat-carrying fluid is discharged from said plurality of distributing zones and delivered into said upper hollow internal semi-spaces, each upper hollow internal semi-space having a substantially parallelepipedic shape, said heat-carrying fluid penetrating into each of said upper hollow internal semi-spaces through a thin face thereof, said thin face being parallel to said axis of said reaction zone and being the closest to said axis,
said heat-carrying fluid flows inside said upper hollow internal semi-spaces in the form of a sheet,
said heat-carrying fluid is discharged from each of said upper hollow internal semi-spaces, through a thin face thereof, said thin face being parallel to said axis of said reaction zone and being the furthest away from said axis, into a plurality of connecting zones each of which connect an upper hollow internal semi-space with a lower hollow internal semi-space situated in the extension of said upper hollow internal semi-space, each lower hollow internal semi-space having a substantially parallelepipedic shape,
said heat-carrying fluid is discharged from said plurality of connecting zones and delivered into each of said lower hollow internal semi-spaces through a thin face thereof, said thin face being parallel to said axis of said reaction zone and being the furthest away from said axis,
said heat-carrying fluid flows inside said lower hollow internal semi-spaces in the form of a sheet, and
said heat-carrying fluid is discharged from each of said lower hollow internal semi-spaces, through a thin face thereof, said thin face being parallel to axis of said reaction zone and being the closest to said axis, into a second plurality of collecting zones which are connected to a central collecting zone from which heat-carrying fluid is then drawn off.

16. A method according to claim 15, wherein said catalyst bed of said second reaction zone contains a plurality of hollow internal spaces defined by walls and of a substantially parallelepipedic shape, through which a heat-carrying fluid flows.

17. A method according to claim 15, wherein said catalyst bed of said first reaction zone is mobile.

18. A method according to claim 17, whererin the pressure in said reaction zones is 0.1 to 0.9 MPa.

19. A method according to claim 1, wherein said catalytic bed is fixed.

20. A method according to claim 5, wherein the catalyst bed of said first zone is fixed.

* * * * *